E. WANDERSLEB.
PHOTOGRAPHIC OBJECTIVE.
APPLICATION FILED MAR. 27, 1913.
1,073,789. Patented Sept. 23, 1913.
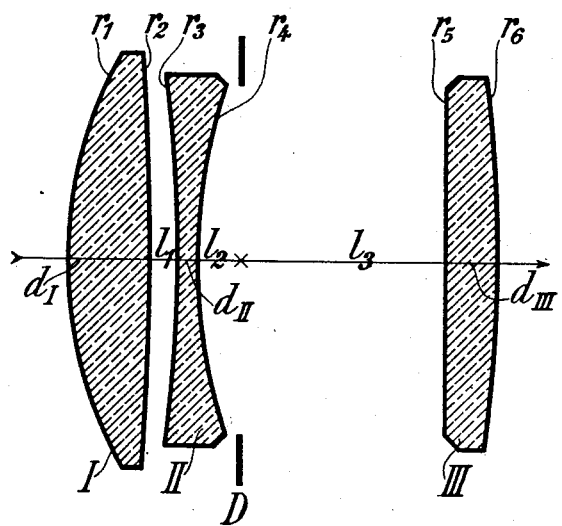

UNITED STATES PATENT OFFICE.

ERNST WANDERSLEB, OF JENA, GERMANY, ASSIGNOR TO THE FIRM OF CARL ZEISS, OF JENA, GERMANY.

PHOTOGRAPHIC OBJECTIVE.

1,073,789.      Specification of Letters Patent.      Patented Sept. 23, 1913.

Application filed March 27, 1913. Serial No. 757,268.

*To all whom it may concern:*

Be it known that I, ERNST WANDERSLEB, a citizen of the German Empire, residing at Jena, Germany, have invented a new and useful Photographic Objective, of which the following is a specification.

The present invention relates to objectives consisting of a dispersive single lens and of two collective single lenses, one of which latter lenses lies in front of the said dispersive lens and the other one behind it, the refractive index of the dispersive lens lying between the values 1.545 and 1.565. An objective of this type has become known through the patent specification 568,052 and is there dealt with in Series V (Fig. 5). This well-known objective has the aperture-ratio 1:7.7 and is so far corrected as regards astigmatism that for an inclination of the pencils on the side nearest the object amounting to about 28° with regard to the axis there remains an astigmatic difference of two per cent. of the focal length of the system.

According to the present invention the correction as regards astigmatism may be substantially improved, without rendering a good correction of the spherical and the chromatic aberrations impossible, by considerably increasing as compared with the said well-known objective the distance between the dispersive lens and the lens lying in front of it. While in the well-known objective this distance amounts to only a little more than one third of one per cent. of the focal length of the system, in the new objective it is not less than two thirds of one per cent. and not greater than one and a half per cent. of the focal length of the system.

In the new objective, along with the spherical correction and the correction in respect of the sine-condition for an aperture-ratio of 1:6.3, such a correction of the astigmatism and of the curvature of the image-field may be obtained that up to an inclination of the pencils on the side nearest the object amounting to about 28° with regard to the axis the astigmatic difference and the deviation of both image surfaces from the ideal focal plane nowhere reach the amount of one per cent. of the focal length of the system.

The annexed drawing shows an objective according to the present invention in axial section.

The form shown applies as regards the general disposition of the members to the two examples given in the following tables, in which the values of the radii of curvature $r$, of the lens-thicknesses $d$ and of the distances $l$ (of the dispersive lens from the lens lying in front of it and from the diaphragm D as also of the diaphragm from the rear collective lens) apply to a focal length of the system equal to 100.

Example 1.

| | I. | II. | III. | |
|---|---|---|---|---|
| $n_D =$ | 1.6113 | 1.5488 | 1.6113 | |
| $\nu =$ | 59.1 | 45.8 | 59.1 | |
| $r_1 =$ | + 16.84 | | $d_I$ | = 3.45 |
| $r_2 =$ | − 116.85 | | $d_{II}$ | = 0.53 |
| $r_3 =$ | − 56.29 | | $d_{III}$ | = 2.12 |
| $r_4 =$ | + 15.35 | | $l_1$ | = 1.04 |
| $r_5 =$ | ∞ | | $l_2$ | = 1.61 |
| $r_6 =$ | − 61.26 | | $l_3$ | = 8.72 |

Example 2.

| | I. | II. | III. | |
|---|---|---|---|---|
| $n_D =$ | 1.6096 | 1.5521 | 1.5892 | |
| $\nu =$ | 58.7 | 42.1 | 61.1 | |
| $r_1 =$ | + 16.87 | | $d_I$ | = 3.23 |
| $r_2 =$ | − 117.13 | | $d_{II}$ | = 0.83 |
| $r_3 =$ | − 56.38 | | $d_{III}$ | = 2.12 |
| $r_4 =$ | + 15.40 | | $l_1$ | = 1.10 |
| $r_5 =$ | ∞ | | $l_2$ | = 1.62 |
| $r_6 =$ | − 57.51 | | $l_3$ | = 8.24 |

I claim:

Spherically, astigmatically and chromatically corrected objective consisting of a dispersive single lens, the refractive index of which for the D-line lies between the values 1.545 and 1.565, and of two collective single lenses, one of which latter lenses is disposed in front of the said dispersive lens and the other one behind it, the distance between the dispersive lens and the lens lying in front of it being not less than two thirds of one per cent. and not greater than one and a half per cent. of the focal length of the total system.

ERNST WANDERSLEB.

Witnesses:
PAUL KRÜGER,
RICHARD HAHN.

Copies of this patent may be obtained for five cents each, by addressing the "Commissioner of Patents, Washington, D. C."